US005155676A

United States Patent [19]

Spreen

[11] Patent Number: 5,155,676

[45] Date of Patent: Oct. 13, 1992

[54] GAPPED/UNGAPPED MAGNETIC CORE

[75] Inventor: James H. Spreen, Stone Ridge, N.Y.

[73] Assignee: International Business Machines Corporation, Armonk, N.Y.

[21] Appl. No.: 786,625

[22] Filed: Nov. 1, 1991

[51] Int. Cl.[5] ........................ H02M 7/06; H02F 27/24

[52] U.S. Cl. .................................... 363/126; 336/178; 336/212; 336/214; 336/233

[58] Field of Search ................ 363/126; 336/221, 212, 336/178, 165, 233, 234, 139

[56] References Cited

U.S. PATENT DOCUMENTS

| | | | |
|---|---|---|---|
| 1,729,713 | 10/1929 | Dicke | 336/175 |
| 2,916,714 | 12/1959 | Donavy | 336/221 X |
| 3,284,741 | 11/1966 | Halascy | 336/214 |
| 3,295,084 | 12/1966 | Hortsman | 336/165 |
| 3,622,928 | 11/1971 | Lee | 336/134 |
| 4,112,404 | 9/1978 | Boushey | 336/133 |
| 4,803,609 | 2/1989 | Gillett et al. | 363/17 |
| 4,853,668 | 8/1989 | Bloom | 336/214 |
| 4,864,486 | 9/1989 | Spreen | 363/126 |
| 4,965,712 | 10/1990 | Duspiva et al. | 336/236 |

*Primary Examiner*—Thomas J. Kozma
*Attorney, Agent, or Firm*—Michael J. Scheer

[57] ABSTRACT

The novel magnetic core structure of this invention provides a combination of large differential type inductance and some common mode type inductance while accommodating common mode dc current in two parallel planar conductors such as bus bars or printed circuit lands. This combination of desirable functions is accomplished by incorporating both gapped and ungapped magnetic flux paths into a single core structure. The core structure is composed of two outer posts, two inner posts, and four link segments. The two inner posts of the present core are located in the position of the center leg of a tradiational E—E core structure. Unlike a conventional E—E core, the structural arrangement of the two inner posts provides both a gapped and an ungapped magnetic flux path. The ungapped magnetic flux path travels in a figure eight pattern, encircling each of the windows of the E—E core in one of the loops of the figure eight. The gapped flux path is created by positioning the two inner posts so that is a gap between the two inner posts themselves, and gap between each of the inner posts and one of the adjacent link segments. The gapped flux path is a closed path which passes through the outer posts and directly between the link segments passing across the air gaps in the center legs. This gapped path does not pass through the inner core posts at all.

11 Claims, 2 Drawing Sheets

GAPPED/UNGAPPED MAGNETIC CORE

FIELD OF THE INVENTION

This invention relates generally to electromagnetic devices and more particularly to magnetic core structures.

BACKGROUND OF THE INVENTION

When evaluating the features and properties of a particular magnetic core structure, it is helpful to think in terms of the currents which flow in the windows of the structure and the corresponding electromagnetic response by the core structure. Any currents which flow in two parallel conductors can be described in terms of common mode and differential mode currents. Common mode currents are those which flow in the same direction in the two conductors, while differential currents flow in opposite directions in the conductors. Given this definition, arbitrary currents in two conductors can be described as a combination of common mode and differential mode currents. Both alternating currents, AC and direct currents, DC, can be described as common and differential mode.

All prior art core structures are able to accommodate certain types of currents, but have correspondingly poor performance with respect to other currents. For example, FIG. 1(*a*) depicts a conventional ungapped E—E magnetic core. This type of core is termed an E—E core because it is typically constructed from two symmetrical halves, each of which is shaped like the letter E. Such an ungapped E—E core provides high differential mode inductance, and high common mode inductance to currents passing through the windows of the E—E core. But such an ungapped core provides negligible direct current capability.

In order to provide dc capability, the center leg of a conventional E—E core can be gapped in a horizontal fashion at the mating surface as depicted in FIG. 1(*b*). The outer legs in the structure of FIG. 1(*b*) are left ungapped. With such a center leg gap, a conventional E—E core can accommodate differential dc current and provide common mode inductance, but at the expense of much reduced differential mode inductance.

The outer legs of a traditional E—E core can also be gapped in a horizontal fashion at the mating surfaces, as seen in FIG. 1(*c*). An E—E core with the outer legs gapped in such a manner can accommodate both common and differential mode dc current, but at the expense of much reduced common and differential mode inductance.

One further way to modify a conventional E—E core is to provide a vertical gap in the center leg as shown in FIG. 1(*d*). An E—E core with such a vertical gap will accommodate common mode dc current without a corresponding reduction of the differential mode inductance. However, a core with this type of vertical gap is limited in its range in that the common mode inductance can never be reduced to less than one quarter the differential mode inductance. Correspondingly, for a given differential mode inductance, there is an upper limit to the common mode dc current which can be accommodated, no matter how large the gap is made.

It is therefore an object to provide common mode inductance, differential mode inductance and common mode dc current capability in a single magnetic core structure.

SUMMARY OF THE INVENTION

The novel magnetic core structure of this invention provides a combination of large differential type inductance and some common mode type inductance while accommodating common mode dc current in two parallel planar conductors such as bus bars or printed circuit lands. This combination of desirable functions is accomplished by incorporating both gapped and ungapped magnetic flux paths into a single core structure.

In order to provide both gapped and ungapped magnetic paths, the core of the present invention is composed of two outer posts (64, 62), two inner posts (61, 63), and four link segments (51-54) as can be seen in FIG. 2. FIG. 2 is a partially exploded, cross-sectional view of the core structure of the present invention. When assembled as indicated by the curved arrow in FIG. 2, mating surface a' mates with face a, b' with b, c' with c and d' with d. The two inner posts (61,63) of the present core are located in the position of the traditional center leg of an E—E core structure. As can be seen from FIG. 2, the structure of the present core is similar to a conventional E—E core in that it encloses two window regions through which conductors can pass. But unlike a conventional E—E core, the structural arrangement of the two inner posts (61, 63) provides both a gapped and an ungapped magnetic flux path.

The ungapped magnetic flux path travels in a figure eight pattern, encircling each of the windows in one of the loops of the figure eight. More precisely, the flux path travels from a first outer post, 62, across a first link segment, 52, down a first inner post, 63, across a fourth link segment, 53, up the second outer post, 64, across a third link segment, 54, down a second inner post, 61, across a second link segment, 51, and back up the first outer post, 62.

The gapped flux path is created by positioning the two inner posts so that is a gap between the two inner posts themselves, and gap between each of the inner posts and one of the adjacent link segments. The gapped flux path is a closed path which passes through the outer posts, 62 and 64, and directly between the link segments, 51-54, passing across the air gaps $g_1$, $g_2$ and $g_3$,. The gapped path does not pass through the inner core posts, 61 and 63.

The novel core structure disclosed here provides a full range of capability. For a given differential inductance, the common mode inductance can range from comparable to the differential inductance at small gaps, to negligible at large gaps, with corresponding common mode dc current capability ranging from small to unbounded. Further, at some finite gap length, the conductors through the windows are magnetically decoupled, even though they may be physically close.

DESCRIPTION OF THE PREFERRED EMBODIMENT

Figure 1A:
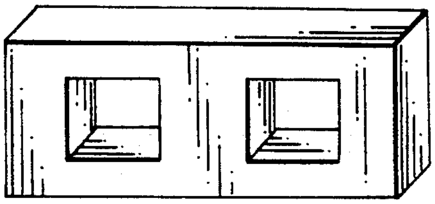
FIG.1a Prior Art
FIGS. 1(*a*-*c*) depict prior art structures for providing either gapped or ungapped flux paths in a magnetic core.
Figure 1C:
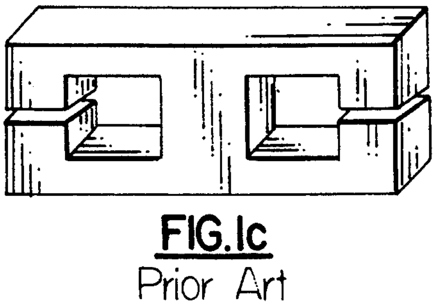
FIG.1c Prior Art
Figure 1B:
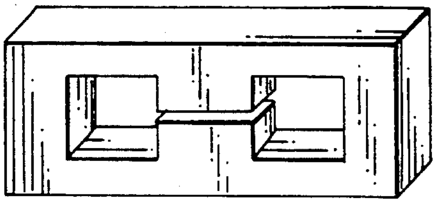
FIG.1b Prior Art
Figure 1D:
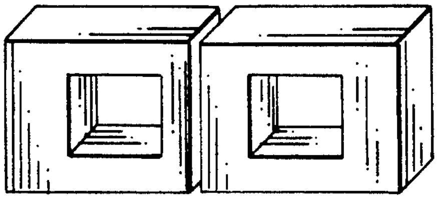
FIG.1d Prior Art
Figure 2:
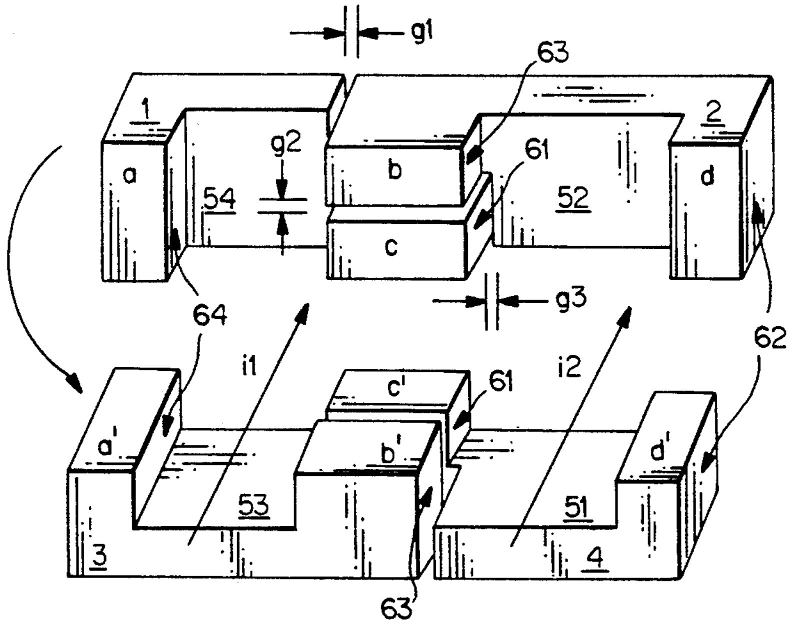
FIG. 2 illustrates the novel magnetic core structure of the present invention in a partially exploded, cross-sectional view.

The novel core structure of the present invention is shown in FIG. 2 with the top lifted. In the preferred embodiment, the structure is composed of four substantially identical pieces labelled 1 through 4 on the figure. Each piece may be ferrite, iron laminations, or other appropriate material chosen on the basis of well known magnetic performance characteristics. Each piece has a link (51-54) which forms a magnetic path between two posts (61-64). The outer post of each piece (64 or 62) is the full width of a link segment. The inner post (61 or 63) is approximately half the width of the link segment.

When assembled as indicated by the curved arrow in FIG. 2, the core pieces enclose two windows which contain the conductors, indicated by the current arrows $i_1$ and $i_2$ in the figure. Currents which flow such that $i_1=i_2$ are described as common mode type currents. In contrast, currents which flow such that $i_1=-i_2$ are described as differential type currents. Note that any window currents may be decomposed into common mode and differential type currents. Therefore, describing the core behavior for common mode and differential type currents is sufficient to describe the core behavior for arbitrary currents.

When the core is assembled, surface d lies directly on surface d', c on c', b on b', and a on a', with no deliberate gaps at these joints. (There will always be some incidental gap because of imperfect mating of the surfaces, as in any assembled core.) Core piece 1 does not touch core piece 2, but is positioned to leave gaps g1, g2, and g3 between the two pieces, as shown in FIG. 1. There are three corresponding gaps between core pieces 3 and 4 which have not been labelled in FIG. 2.

The novel core structure as described above provides both an ungapped and a gapped magnetic flux path around the pair of conductors. The ungapped path is one continuous flux path through all segments of the core (all four posts and all four links) in essentially a figure eight pattern. The path may be traced by starting at the a—a' joint in outer post 64, going down post 64 to link 53, across link 53, up the inner post 63, across link 52, down the other outer post 62, across link 51, up inner post 61, across link 54, and back down post 64, closing this path without crossing any gap. As can be see by tracing the path of this ungapped flux path, it essentially defines a figure eight pattern, each loop of the figure eight enclosing one of the windows of the core. This ungapped flux path provides large inductive impedance to differential type currents flowing in both windows enclosed by the core structure.

The gapped path may be traced by starting at the a—a' joint in post 64, going up post 64, across link 54, across the g1-g2-g3 top gap into link 52, across link 52, down post 62, across link 51, across the bottom gaps into link 53, across link 53, and up post 64, closing this path by crossing two gapped areas. It can now be seen that the gapped flux path travels in a circular pattern around the outside segments of the core structure. This circular flux path encloses both windows of the core. The gapped flux path provides common mode inductance to currents in the two conductors. Additionally, since this magnetic flux path is gapped, it can accommodate common mode dc current.

TABLE 1

| Core | differential mode inductance | differential mode dc ? | common mode inductance | common mode dc ? |
|---|---|---|---|---|
| 1. Ungapped E-E (FIG. 1a) | high | no | high | no |
| 2. E-E with gapped center leg (FIG. 1b) | low | yes | high | no |
| 3. E-E with gapped outer leg (FIG. 1c) | low | yes | low | yes |
| 4. E-E with gap along center leg (FIG. 1d) | high | no | high (limited range) | yes, but limited |
| 5. Gapped/Ungapped core (FIGS. 2-4) | high | no | low | yes |

Table 1 contrasts the prior art core structures described in FIG. 1(*a*-*d*) to the inventive core structure with respect to four different features. The features compared are the relative inductances and the dc current capability for both differential and common mode currents. The columns for differential and common mode dc are intended to depict whether or not the given core structure is capable of accommodating the particular current. Table 1 is not intended to present a very refined comparison. For example, for a given core volume, the gapped/ungapped core of the present invention provides a lower differential inductance than an ungapped E—E core or an E—E core with a vertical gap, even though all are listed on the table as providing "high" differential mode inductance. However, even at this level of comparison, it is evident from the table that the gapped/ungapped core disclosed here provides a combination of these four features which is not available from any other core structure.

In FIG. 2, the core has been shown with posts and links of rectangular cross section. A possible variation on this structure would include rounded posts. Further, all four core pieces need not be identical so long as when the core is assembled, the pieces provide the paths described above. Any of the well known techniques of tapered or stepped gaps which provide swinging choke or controlled saturation characteristics could be employed with this structure.

As an alternative to the four piece assembly as described above, the core of the present invention can be constructed from two pieces. This would be desirable from a manufacturing and assembly point of view, since alignment of the four pieces depicted in FIG. 2 can be difficult. This two piece construction can be accomplished by mechanically attaching core piece 1 to core piece 2 and similarly attaching piece 3 to piece 4. It is essential though, that any method of attachment maintain the integrity of the magnetic flux paths as previously described, namely, the gaps between the core segments must remain relatively magnetically inert (e.g. comparable magnetic properties to the air gaps).

Some methods of attachment might include filling the air gaps, $g_1$, $g_2$ and $g_3$ with a non-magnetic epoxy resin, or a non-magnetic ceramic. Factors to be considered for these filling approaches include the temperature coefficients of expansion and the adhesive properties of the filler material. Care must be taken to ensure that the filler material will react properly given the particular operating conditions of the core structure.

Another method to create a two piece structure would be to have relatively minor ferrite bridges cross the gaps to create structural stability. Again, care must be taken that these additional ferrite bridges do not disturb the gapped flux path of the present invention. During operation, these thin bridges should saturate magnetically to behave as the core in FIG. 2. At lower currents, a core with these bridges would exhibit some swinging choke characteristics.

Figure 3:
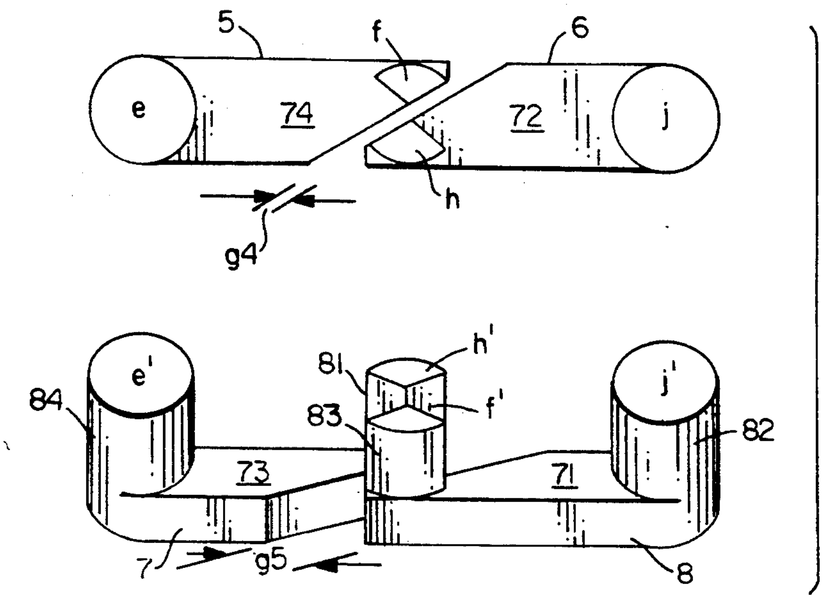
FIG. 3 depicts the present invention with diagonal gaps between cylindrical center legs of the core.

FIG. 3 depicts the present invention with two diagonal gaps, $g_4$ and $g_5$, instead of the 6 gaps shown in FIG. 2. Similar to FIG. 2, FIG. 3 depicts the core structure in a cross sectional, partially exploded view. When assembled, face e of piece 5 mates with face e' of piece 7, while face f of piece 5 mates with face f' of piece 8. Similarly, face h mates with h' and face j mates with j'. Like the core structure shown in FIG. 2, the core with the diagonal gaps shown in FIG. 3 provides both gapped and an ungapped flux paths in the same structure.

The ungapped path of the core of FIG. 3 may be traced by starting at the e—e' joint in outer post 84, going down post 84 to link 73, across link 73, up the inner post 81, across link 72, down the other outer post 82, across link 71, up inner post 83, across link 74, and back down post 84, closing this path without crossing any gap. As with core of FIG. 2, the ungapped path essentially defines a figure eight pattern, each loop of the figure eight enclosing one of the windows of the core.

The gapped path of the core in FIG. 2 may be traced by starting at the e—e' joint in post 84, going up post 84, across link 74, across the $g_4$ gap into link 72, across link 72, down post 82, across link 71, across the bottom gap, $g_5$, into link 73, across link 73, and up post 84, closing this path by crossing two gaps. Again, as with core of FIG. 2, the gapped path can be seen as traveling in a circular pattern around the outside segments of the core structure, enclosing both windows of the core.

In one embodiment of this novel core structure, the diagonal gaps as shown in FIG. 3 were 0.2" (5 mm). The post diameter was 0.65" (15 mm), while the center to center dimension between outer posts was 3.0" (76 mm). A core with these specific dimensions was observed to have a 30 nanohenry inductance to common mode window current, a 3 microhenry inductance to differential mode window current and a 700 amp common mode dc current limit.

Figure 4:
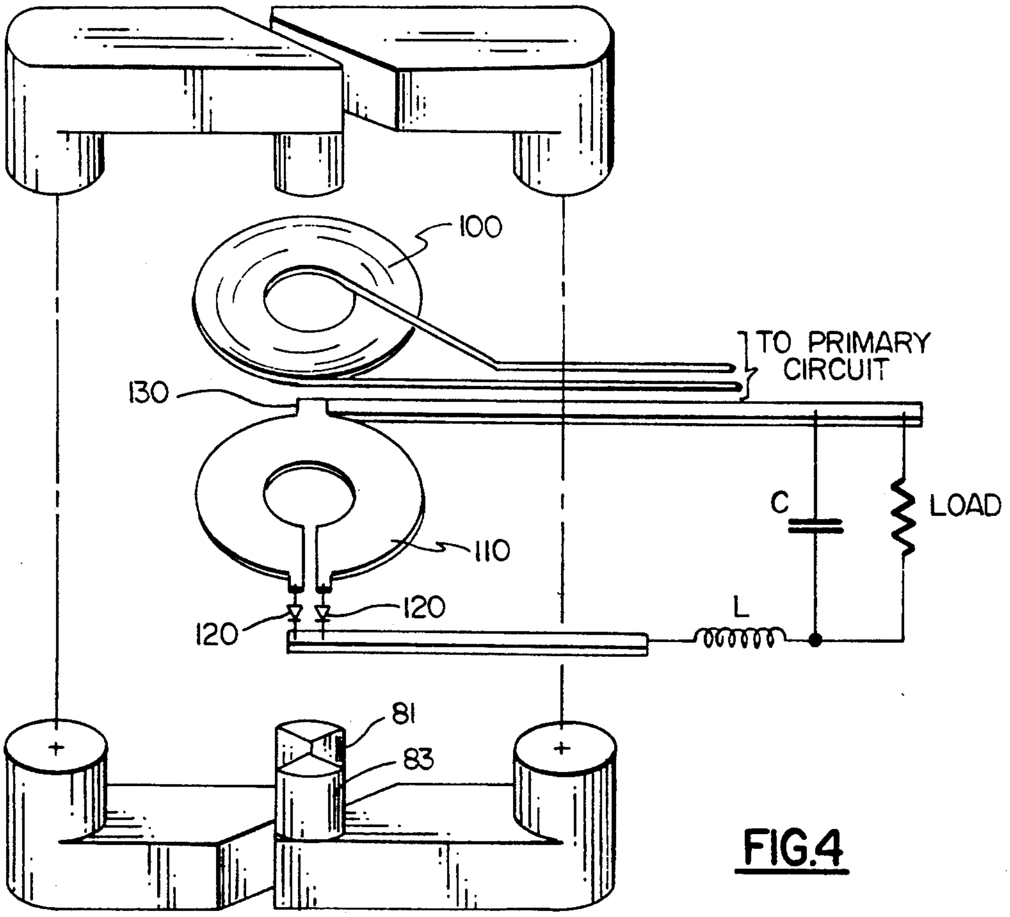
FIG. 4 depicts the core of the present invention as used in a transformer circuit.

The novel core of the present invention has several areas of specific application, such as use in a transformer/inductor, driven by a bridge primary circuit as depicted in FIG. 4. As seen in FIG. 4, the novel core of the present invention has a primary winding, 100, and a secondary winding, 110, encircling the two center leg posts 81 and 83. The primary winding, 100, is connected to an external primary circuit not depicted in FIG. 4. The secondary, 110, is connected to the load circuit via the two rectifiers 120, and the center tap, 130. The load circuit consists of the load, and an output filter consisting of an inductor, L, and a capacitor, C. The high differential mode inductance provided by the novel core structure corresponds to a large magnetizing inductance. The common mode inductance and dc current capability correspond to an effective series inductance added to the secondary filter inductor, L, which must accommodate the dc output current.

In such a transformer application, the capability of the present core structure is limited by the combination of the ac transformer flux and the dc inductor flux. In terms of circuit variables, this combination limits the combination of output voltage and current. In principle, a core with the dimensions described above could supply 700 amps of output current, but at a zero output voltage. In one embodiment, the transformer with the present core was operated at 3.6 volts with 350 amps output, and 2.1 volts with 400 amps output. Naturally, these values are governed by the specific dimensions used for the core. It can be seen by one skilled in the art that by varying the core dimensions, the desired operating capabilities can be tailored to a specific application.

The novel core of the present invention can also be used to aid in the reduction of ripple current in parallel power trains. In order to increase the current output, two separate switch mode converter power trains may be run in parallel, with interleaved switching to reduce the ripple currents. The dominant ripple components on the two output busses are then differential mode, imposed on a large common mode dc. The core disclosed here has the unique capability to provide an ungapped flux path for high inductance to filter the differential ripple components of the output pair, while at the same time accommodating the common mode dc output current. Furthermore, the core will provide some common mode filtering, in the adjacent output busses.

While particular embodiments of the present invention have been shown and described, it will be understood by those skilled in the art that modifications may be made to a particular embodiment without departing from the true spirit and scope of the present invention.

I claim:

1. An electromagnetic device comprising:

a core of magnetic material enclosing two separate window regions;

said core providing first and second magnetic flux paths;

said first magnetic flux path being ungapped and enclosing said window regions in a FIG. 8 pattern; and said second magnetic flux path being gapped and encircling both of said window regions together in a circular pattern.

2. An electromagnetic device according to claim 1 wherein;

each of said window regions being enclosed by an outer post, an inner post and two link segments of said core.

3. An electromagnetic device according to claim 2 wherein;

said ungapped magnetic flux path passes through all of said posts and said links of said core; and said gapped magnetic flux path passes only through said outer posts and said links of said core.

4. An electromagnetic device according to claim 1 wherein;

at least one electrical conductor passes through each of said window regions.

5. An electromagnetic device according to claim 4 wherein;

each of said electrical conductors is a power supply output bus; and said electromagnetic device providing inductance to both common mode and differential mode currents in said electrical conductors; and said electromagnetic device further accommodating dc current.

6. An electromagnetic core structure comprising:

first and second outer core post segments;
first and second inner core post segments;
first, second, third and fourth link segments;
said segments being connected to form a continuous, ungapped magnetic path through, in order, said first outer post, said first link, said first inner post, said fourth link, said second outer post, said third link, said second inner post, said second link and said first outer post;
said inner posts being positioned so as to form low reluctance gaps between said first and second inner posts, said first inner post and said third link, said first inner post and said second link, said second inner post and said first link, said second inner post and said forth link.

7. An electromagnetic device according to claim 6 wherein;
said core posts are rectangular in shape.

8. An electromagnetic device according to claim 6 wherein;
said core posts are cylindrical in shape.

9. An electromagnetic device according to claim 6 wherein;
said gaps are air gaps.

10. A transformer/inductor comprising:
a first outer post integrally connected to a first inner post by a first link segment;
said first outer post integrally connected to a second inner post by a second link segment;
a second outer post integrally connected to said second inner post by a third link segment;
said second outer post being integrally connected to said first inner post by a fourth link segment;
said posts and links being positioned so as to form low reluctance gaps between said first and second inner posts, said first inner post and said third link, said first inner post and said second link, said second inner post and said first link, said second inner post and said fourth link;
a primary winding encircling both of said inner core posts; and
a secondary winding encircling both of said inner core posts.

11. A transformer/inductor according to claim 10 wherein;
said primary winding is connected to a primary driving circuit; and
said secondary is connected to a load/filter circuit.

* * * * *